(12) United States Patent
Ma et al.

(10) Patent No.: US 9,170,460 B2
(45) Date of Patent: Oct. 27, 2015

(54) IN-PLANE-SWITCHING MODE LIQUID CRYSTAL PANEL, MANUFACTURING PROCESS AND DISPLAY DEVICE THEREOF

(75) Inventors: Xiaolong Ma, Guangdong (CN); Hong-Ji Huang, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 111 days.

(21) Appl. No.: 13/638,078

(22) PCT Filed: Jun. 28, 2012

(86) PCT No.: PCT/CN2012/077736
§ 371 (c)(1),
(2), (4) Date: Sep. 28, 2012

(87) PCT Pub. No.: WO2013/185383
PCT Pub. Date: Dec. 19, 2013

(65) Prior Publication Data
US 2013/0335659 A1    Dec. 19, 2013

(30) Foreign Application Priority Data
Jun. 15, 2012  (CN) .......................... 2012 1 0197644

(51) Int. Cl.
*G02F 1/1339* (2006.01)
*G02F 1/1343* (2006.01)
*G02F 1/1333* (2006.01)
*G02F 1/1337* (2006.01)

(52) U.S. Cl.
CPC ........ *G02F 1/134363* (2013.01); *G02F 1/1333* (2013.01); *G02F 1/133711* (2013.01); *G02F 2001/133726* (2013.01); *G02F 2001/133765* (2013.01)

(58) Field of Classification Search
CPC ................... G02F 1/134363; G02F 1/133711; G02F 2001/133726; G02F 2001/133765
USPC ........................................................ 349/141
See application file for complete search history.

(56) References Cited

U.S. PATENT DOCUMENTS

| 6,014,124 | A  * | 1/2000 | Dickinson et al. ............ 345/100 |
| 7,102,707 | B2 * | 9/2006 | Fujimaki et al. .............. 349/106 |
| 7,633,588 | B2 * | 12/2009 | Lin et al. ....................... 349/141 |
| 8,330,693 | B2 * | 12/2012 | Wen et al. ....................... 345/94 |

(Continued)

*Primary Examiner* — Paul Lee
*Assistant Examiner* — Agnes Dobrowolski
(74) *Attorney, Agent, or Firm* — Kirton McConkie; Evan R. Witt

(57) ABSTRACT

The present invention provides to an in-plane-switching (IPS) mode liquid crystal panel, which comprises: a first substrate, a second substrate, a coplanar transparent electrode layer and a liquid crystal layer. The first and second substrates have a first alignment film and a second alignment film, respectively. The coplanar transparent electrode layer is disposed onto the second alignment film. The liquid crystal layer is disposed in a space between the first alignment film of the first substrate and the coplanar transparent electrode layer of the second substrate. The liquid crystal layer comprises dual-frequency liquid crystal molecules and dual-frequency reactive mesogens/monomers. The liquid crystal panel of the present invention can overcome the problems of pollution and static electricity generated from the rubbing alignment in the in-plane-switching (IPS) mode, so as to simplify the manufacturing process and provide the advantages of high contrast, high response speed and wide viewing angle.

16 Claims, 3 Drawing Sheets

(56) References Cited

U.S. PATENT DOCUMENTS

2010/0182556 A1* 7/2010 Oh et al. ................... 349/127
2010/0265235 A1* 10/2010 Lee .............................. 345/211
2011/0134382 A1* 6/2011 Miyakawa et al. ........... 349/139
2011/0242443 A1* 10/2011 Choi et al. ..................... 349/38

* cited by examiner

IN-PLANE-SWITCHING MODE LIQUID CRYSTAL PANEL, MANUFACTURING PROCESS AND DISPLAY DEVICE THEREOF

FIELD OF THE INVENTION

The present invention relates to a field of a liquid crystal panel, and more particularly to an in-plane-switching (IPS) mode liquid crystal panel, a manufacturing process thereof, and a display device using the liquid crystal panel.

BACKGROUND OF THE INVENTION

A liquid crystal display (LCD) comprises a liquid crystal panel and a backlight module, wherein the liquid crystal panel has a top substrate and a bottom substrate, and inner surfaces of the top and the bottom substrates opposed to each other are disposed with transparent electrodes, and a layer of liquid crystal molecules is disposed between the substrates. The transparent electrodes of the LCD generate an electric field to control a direction of liquid crystal molecules, so as to change a polarization status of light and carry out transmission and blocking of a light pathway by a polarizer, so as to achieve an object of displaying.

The major technical parameters of evaluating the LCD includes: (1) contrast; (2) brightness; (3) signal response time; and (4) viewing angle, wherein the parameters of contrast, brightness and viewing angle are depended on a liquid crystal panel. The viewing angle is always an important and difficult key in the research of the liquid crystal panel, because a backlight source passes through a polarizer, a liquid crystal layer and an alignment film to output light with a direction. That is to say, most of light is emitted vertically from a screen. Thus, if viewing the liquid crystal panel with one of tilted angle, it is unable to see original colors, and even only totally white or totally black. To solve the problem, therefore, the researchers develop a wide-angle skill, so as to research and develop an in-plane-switching (IPS) mode liquid crystal panel.

The liquid crystal molecules of the liquid crystal layer are positive liquid crystals, and transparent electrodes are disposed on the bottom substrate. Before being charged, the liquid crystal molecules are arranged parallel to the substrate with no optical latency, so that it can acquire a darker state. After being charged, the liquid crystal molecules are parallel rotated to cause emitting polarized light to transmit, so that it is normally black. An in-plane-switching (IPS) mode has the advantages of high contrast and high response speed, so as to be applied to television field. However, in the preparation process of the IPS mode liquid crystal panel, it is necessary to apply rubbing to the substrate, so as to apply initial alignment to the liquid crystal molecules. As a result, the rubbing alignment brings the issue of pollution, causes the decrease of the yield, and generates the problem of static electricity thereto, so as to cause damage to transistors.

As a result, the present invention provides a new manufacturing method of an IPS mode liquid crystal panel, which can overcome the problems of pollution and static electricity by the IPS mode rubbing alignment and simplify the manufacturing procedure, so that the liquid crystal panel and the liquid crystal displayer have the advantages of high contrast, high response speed and wide viewing angle.

SUMMARY OF THE INVENTION

The first object of the present invention is to provide a manufacturing process of an IPS mode liquid crystal panel, so as to overcome the problems of pollution and static electricity by the IPS rubbing alignment and simplify the manufacturing procedure, so that the liquid crystal panel and the liquid crystal displayer can have the advantages of high contrast, high response speed and wide viewing angle.

The idea of the present invention is to apply the dual-frequency character of dual-frequency liquid crystal molecules and dual-frequency reactive mesogens, and in alignment procedure, using a high frequency alternating electric field to drive, so that dual-frequency liquid crystal molecules and dual-frequency reactive mesogens of the substrates opposite to one surface of the liquid crystal layer will generate a pre-tilted angle by effect of an alignment film. Through ultraviolet (UV) lighting the liquid crystal layer, the dual-frequency reactive mesogens with the pre-tilted angles are cured onto the surface, so as to finish an alignment procedure. While driving the LCD panel of the present invention, applying a low-frequency alternating electric field, so that it can drive dual-frequency liquid crystal molecules and dual-frequency reactive mesogens.

To achieve the foregoing object, the present invention provides a technical solution, wherein a manufacturing process of a liquid crystal panel comprises steps of:

providing a first substrate and a second substrate, wherein a first alignment film is formed on the first substrate and a second alignment film is formed on the second substrate;

forming a coplanar transparent electrode layer on the second alignment film of the second substrate, wherein the coplanar transparent electrode layer comprises at least two transparent electrodes, and a slit is formed between the transparent electrodes;

filling a liquid crystal composition into a space between the first substrate and the second substrate to form a liquid crystal layer, wherein the liquid crystal layer is in contact with the first alignment film, the coplanar transparent electrode layer and the second alignment film in the slit; and the liquid crystal composition comprises dual-frequency liquid crystal molecules and dual-frequency reactive mesogens;

applying a high frequency alternating electric field onto the adjacent transparent electrodes, so that a long axis of molecules of a liquid crystal composition is arranged vertical to a direction of the electric field and a pre-tilted angle is defined there between; and applying an ultraviolet (UV) light thereto, so as to finish the alignment of the liquid crystal composition; and attaching a polarizer onto one surface of the first and second substrates opposite to the liquid crystal composition, respectively, so as to form a liquid crystal panel.

In one embodiment of the present invention, at least two of the coplanar transparent electrodes are disposed parallel to each other, and span the second substrate, respectively.

In one embodiment of the present invention, the frequency range of the high frequency alternating electric field is between 1000 Hz and 10000 Hz.

In one embodiment of the present invention, the coplanar transparent electrode layer is made of indium tin oxide (ITO).

In one embodiment of the present invention, the first substrate is a color filter (CF) substrate, and the second substrate is a thin film transistor (TFT) array substrate.

In a preferred embodiment of the present invention, a manufacturing process of an in-plane-switching mode liquid crystal panel is provided, and comprises steps of:

providing a first substrate and a second substrate, wherein a first alignment film is formed on the first substrate and a second alignment film is formed on the second substrate;

forming a coplanar transparent electrode layer made of indium tin oxide (ITO) on the second alignment film of the second substrate, wherein the coplanar transparent electrode layer comprises at least two parallel transparent electrodes, and a slit is formed between the transparent electrodes which span the second substrate, respectively;

filling a liquid crystal composition into a space between the first substrate and the second substrate to form a liquid crystal layer, wherein the liquid crystal layer is in contact with the first alignment film, the coplanar transparent electrode layer and the second alignment film in the slit; wherein the liquid crystal composition comprises dual-frequency liquid crystal molecules and dual-frequency reactive mesogens;

applying a high frequency alternating electric field with a frequency range between 1000 Hz and 10000 Hz onto the adjacent transparent electrodes, so that a long axis of molecules of the liquid crystal composition is arranged vertical to a direction of the electric field and a pre-tilted angle is defined therebetween; and applying an ultraviolet (UV) light thereto, so as to finish the alignment of the liquid crystal composition; and attaching a polarizer onto one surface of the first and second substrates opposite to the liquid crystal composition, respectively, so as to form a liquid crystal panel.

Preferably, the first substrate is a color filter (CF) substrate, and the second substrate is a thin film transistor (TFT) array substrate.

The second object of the present invention is to provide an in-plane-switching mode liquid crystal panel, comprising:
a first substrate having a first alignment film;
a second substrate having a second alignment film;
a coplanar transparent electrode film disposed on the second alignment film of the second substrate, wherein the coplanar transparent electrode layer comprises at least two transparent electrodes, and a slit is formed between the transparent electrodes; and
a liquid crystal layer disposed in a space between the first alignment film of the first substrate and the coplanar transparent electrode layer of the second substrate, wherein the liquid crystal layer comprises dual-frequency liquid crystal molecules and dual-frequency reactive mesogens;
wherein a plurality of the liquid crystal compositions arranged based on a pre-tilted angle are formed onto surfaces of the first alignment film and the coplanar transparent electrode layer opposite to the liquid crystal layer, respectively.

In one embodiment of the present invention, at least two coplanar transparent electrodes are disposed each other, and span the second substrate, respectively.

In one embodiment of the present invention, the coplanar transparent electrode layer is made of indium tin oxide (ITO).

In one embodiment of the present invention, the first substrate is a color filter (CF) substrate, and the second substrate is a thin film transistor (TFT) array substrate.

In one preferred embodiment of the present invention, a liquid crystal panel is provided, and comprises:
a first substrate having a first alignment film;
a second substrate having a second alignment film;
a coplanar transparent electrode film disposed on the second alignment film of the second substrate, wherein the coplanar transparent electrode layer comprises at least two transparent electrodes, and a slit is formed between the transparent electrodes; and
a liquid crystal layer disposed in a space between the first alignment film of the first substrate and the coplanar transparent electrode layer of the second substrate, wherein the liquid crystal layer comprises dual-frequency liquid crystal molecules and dual-frequency reactive mesogens;
wherein a plurality of the liquid crystal compositions arranged based on a pre-tilted angle are formed onto surfaces of the first alignment film and the coplanar transparent electrode layer opposite to the liquid crystal layer, respectively.

Preferably, the first substrate is a color filter (CF) substrate, and the second substrate is a thin film transistor (TFT) array substrate.

The third object of the present invention is to provide a liquid crystal device, which comprises any type of the liquid crystal panel and a backlight mode. The invention is no particular limitation to the backlight mode, so that it can use the backlight mode of conventional IPS mode liquid crystal devices.

It should be noted that the dual-frequency liquid crystal molecules (or the dual-frequency reactive mesogens) are liquid crystal molecules (or reactive mesogens) having dual frequency character. The dual frequency character is the character of the dual-frequency liquid crystal molecules (or the dual-frequency reactive mesogens) arranged along a direction of an electric field will change following the variation of driving frequency. For example, when being driven by high-frequency alternating electric field, the long axes of the dual-frequency liquid crystal molecules (or the dual-frequency reactive mesogens) are vertical arranged to the direction of the electric field, so as to present the character of negative liquid crystal; and when being driven by low-frequency alternating electric field, the long axes of the dual-frequency liquid crystal molecules (or the dual-frequency reactive mesogens) are arranged parallel to the direction of the electric field, so as to present the character of positive liquid crystal.

The invention applies the dual-frequency character of the dual-frequency liquid crystal molecules and the dual-frequency reactive mesogens, and integrates the arrangement of the coplanar transparent electrode using high-frequency alternating electric field to drive, so that dual-frequency liquid crystal molecules and dual-frequency reactive mesogens of the substrates opposite to one surface of the liquid crystal layer will generate a pre-tilted angle by effect of an alignment film. Through ultraviolet (UV) lighting the liquid crystal layer, the dual-frequency reactive mesogens with the pre-tilted angles are cured onto the surface, so as to finish an alignment procedure. While driving the LCD panel of the present invention, applying to a low-frequency alternating electric field, so that it can drive dual-frequency liquid crystal molecules and dual-frequency reactive mesogens. The liquid crystal panel and the liquid crystal device of the present invention have the advantages of high contrast, high response speed and wide viewing angle and overcome the problems of pollution and static electricity by the IPS mode rubbing alignment, furthermore, the procedure is easy, so as to simplify the manufacturing procedure.

40 is a second alignment film;
50 is a coplanar transparent electrode layer;
501 is a transparent electrode;
502 is a slip between the transparent electrodes;
60 is a liquid crystal layer;
601 is a dual-frequency liquid crystal molecule;
602 is a dual-frequency reactive mesogen;
70 is a first polarizer;
80 is a second polarizer.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
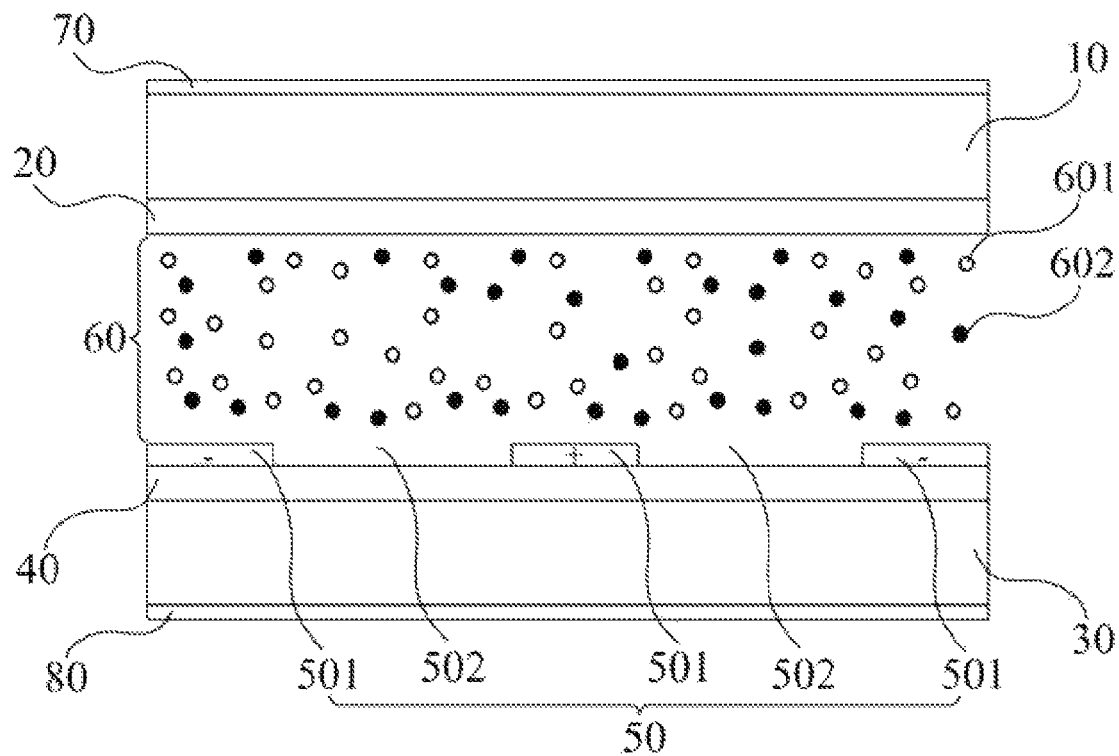
FIG. 1 is a distributional status schematic view of dual-frequency liquid crystal molecules and dual-frequency reactive mesogens of an IPS mode liquid crystal panel after being charged according to one embodiment of the present invention.

Referring now to FIG. 1, FIG. 1 is a sectional view of an IPS mode liquid crystal panel after being charged according to one embodiment of the present invention. The liquid crystal panel comprises a first substrate 10, a second substrate 30, a first alignment film 20, a second alignment film 40, a coplanar transparent electrode layer 50, a liquid crystal layer 60, a first polarizer 70 and a second polarizer 80, wherein the first substrate 10 is a color filter (CF) and the second substrate 30 is a TFT array substrate. The first substrate 10 is opposite to the second substrate 30. The one surface of the first substrate 10 corresponding to the liquid crystal layer 60 is disposed the first alignment film 20 and the one surface of the second substrate 30 corresponding to the liquid crystal layer 60 is disposed the second alignment film 40. The coplanar transparent electrode layer 50 is made of indium tin oxide (ITO) and formed on the second alignment film 40 of the second substrate 30. The coplanar transparent electrode layer 50 comprises at least two coplanar parallel set of the transparent electrodes 501, wherein a slit 502 is formed between the transparent electrodes 501. Referring to FIG. 1, according to the embodiment of the present invention, the coplanar transparent electrode layer 50 comprises: three coplanar parallel set of the transparent electrodes 501. The liquid crystal layer 60 disposed in a space between the first alignment film 20 of the first substrate 10 and the coplanar transparent electrode layer 50 of the second substrate 30, wherein the liquid crystal layer has a liquid crystal composition comprising dual-frequency liquid crystal molecules 601 and reactive mesogens 602; the first polarizer 70 is disposed on the other surface of the first substrate 10 corresponding to the liquid crystal layer 60 and the second polarizer 80 is disposed on the other surface of the second substrate 30 corresponding to the liquid crystal layer 60.

Figure 2:
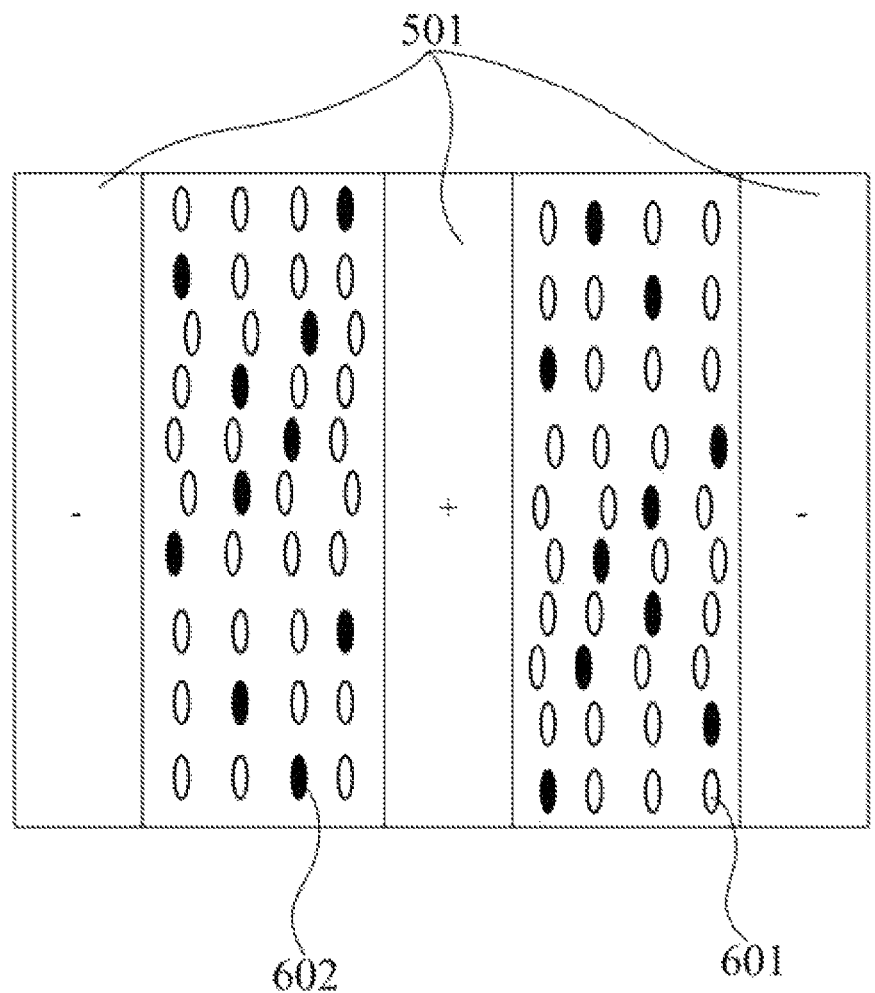
FIG. 2 is a top view of a second substrate according to FIG. 1.

Referring to FIG. 2, FIG. 2 is a top view of the second substrate 30 according to FIG. 1. The transparent electrodes 501 are the coplanar transparent electrodes disposed parallel to each other, and span the second substrate, respectively 30, respectively.

The embodiment also provides a manufacturing process of the foregoing IPS mode liquid crystal panel, comprising the steps of:

providing a first substrate 10 and a second substrate 30, the first substrate is a color filter (CF) substrate, and the second substrate is a thin film transistor (TFT) array substrate; the manufacturing method of the first and the second substrates 10,30 uses the regular method of the art, so that the details thereof are omitted herein;

forming the first alignment film 20 on the first substrate 10 and forming a second alignment film 40 on the second substrate 30; wherein the first and the second alignment films 20,40 are vertical alignment films; the manufacturing method of the first and the second alignment films 20,40 uses the regular method of the art, so that the details thereof are omitted herein;

forming a coplanar transparent electrode layer 50 on the second alignment film 40 of the second substrate 30, wherein the coplanar transparent electrode layer 50 comprises at least two coplanar parallel set of the transparent electrodes 501, and a slit 502 is formed between the transparent electrodes 501. According to the embodiment, the coplanar transparent electrode layer 50 comprises three the coplanar transparent electrodes 501 disposed parallel to each other, and span the second substrate 30. The transparent electrodes 501 are indium tin oxide (ITO) electrodes, the manufacturing method of the transparent electrodes 501 uses the regular method of the art, so that the details thereof are omitted herein;

filling a liquid crystal composition comprising dual-frequency liquid crystal molecules 601 and dual-frequency reactive mesogens 602 into a space between the first substrate 10 and the second substrate 30 to form a liquid crystal layer 60, wherein the liquid crystal layer 60 is in contact with the first alignment film 20, the coplanar transparent electrode layer 50 and the second alignment film 40 in the slit 502;

applying ≥1000 Hz of a high frequency alternating electric field onto the adjacent transparent electrodes 501 and applying an ultraviolet (UV) light, so as to finish the liquid crystal alignment; and attaching first and second polarizers 70,80 onto the other surface of the first and second substrates 10,30 opposite to the liquid crystal layer 60, respectively, so as to form a liquid crystal panel.

Figure 3:
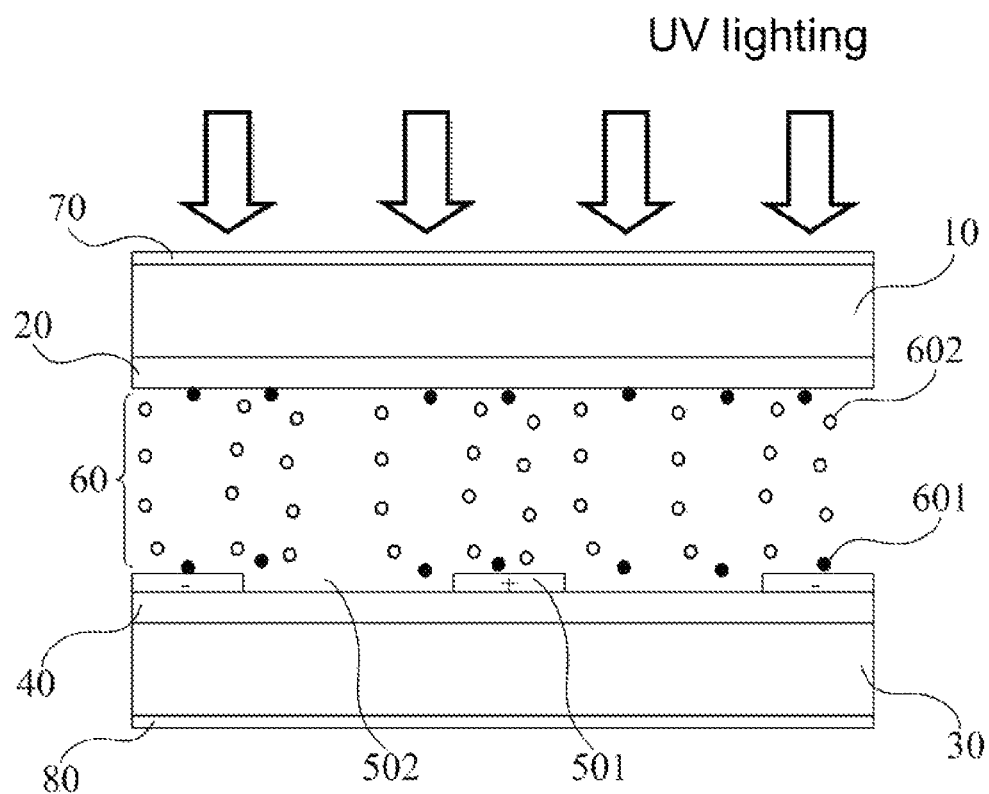
FIG. 3 is a distributional status schematic view of dual-frequency liquid crystal molecules and dual-frequency reactive mesogens of the IPS mode liquid crystal panel in alignment procedure according to one embodiment of the present invention, wherein comprising:
10 is a first substrate;
20 is a first alignment film;
30 is a second substrate.

Referring to FIG. 2 again, while applying the frequency range of the high frequency alternating electric field is between 1000 Hz and 10000 Hz onto the adjacent transparent electrodes 501 of the second substrate 30, the axes of the dual-frequency liquid crystal molecules 601 and the dual-frequency reactive mesogens 602 are vertical arranged to a direction of the electric field. Referring to FIG. 3, FIG. 3 is the dual-frequency liquid crystal molecules 601 and dual-frequency reactive mesogens 602 occurring polymerization through UV lighting, so as to cure onto one surface of the first alignment film 20 and the coplanar transparent electrode layer 50 opposite to the liquid crystal layer 60 in alignment procedure according to one embodiment of the present invention. According to the procedure of UV lighting, that is still at the status of being charged, therefore, the dual-frequency reactive mesogens 602, affected to the effect of electric field and the anchoring force of the alignment film and removed to the surfaces of the first alignment film 20 and the coplanar transparent electrode layer 50, have a particular direction, so as to a pre-tilted angle as usually said. After that, applying UV light cures the pre-tilted angle of the dual-frequency reactive mesogens 602, so as to finish alignment procedure.

In the working steps of driving the liquid crystal panel, applying ≤250 Hz of low frequency alternating electric field is in a space between the adjacent transparent electrodes 501 of the second substrate 30. According to the character of the dual-frequency, the long axes of the dual-frequency liquid crystal molecules 601 and the dual-frequency reactive mesogens 602 are arranged parallel to the direction of the electric field, and at this time, the size of deflexion angle of the dual-frequency liquid crystal molecules 601 and the dual-frequency reactive mesogens 602 is decided by the influence of the electric field. However, the size of deflexion angle of the dual-frequency liquid crystal molecules 601 and the dual-frequency reactive mesogens 602 decides to the efficiency of light, and passing through different deflection angle can generate different grey scale, so as to achieve the object of imaging.

The present invention applies the advantages of the dual-frequency liquid crystal molecules and the dual-frequency reactive mesogens and combines the arrangement of the coplanar transparent electrode, applying high frequency alternating electric field to drive in the step of alignment procedure, to cause one surface of the dual-frequency liquid crystal molecules and the dual-frequency reactive mesogens of the substrate opposite to the liquid crystal layer is affected to the effect of the alignment film, so as to generate the pre-tilted angle. And then, through UV lighting, to cause the dual-frequency liquid crystal molecules and the dual-frequency reactive mesogens of maintaining the pre-tilted angle are cured onto the surface of the first alignment film and the surface of the coplanar transparent electrode layer, so as to finish alignment procedure. While driving the liquid crystal panel of the present invention, to apply low frequency alternating electric field can driving the dual-frequency liquid crystal molecules and the dual-frequency reactive mesogens. The liquid crystal panel and the liquid crystal device of the present invention have the advantages of high contrast, high response speed and wide viewing angle of the IPS mode, and overcome the problems of pollution and static electricity by the IPS mode rubbing alignment, furthermore, the procedure is easy, so as to simplify the manufacturing procedure.

As described on, the present invention has been described with related embodiments thereof and the above embodiments are only patterns to carry out the present invention. It is necessary to note that the disclosed embodiments with no limited the scope of the invention. Conversely, many changes and modifications to the described embodiment can be carried out without departing from the scope and the spirit of the invention that is intended to be limited only by the appended claims.

The invention claimed is:

1. A manufacturing process of an in-plane-switching mode liquid crystal panel, comprising steps of:
providing a first substrate and a second substrate, wherein a first alignment film is formed on the first substrate and a second alignment film is formed on the second substrate;
forming a coplanar transparent electrode layer on the second alignment film of the second substrate, wherein the coplanar transparent electrode layer comprises at least two transparent electrodes, and a slit is formed between the transparent electrodes;
filling a liquid crystal composition into a space between the first substrate and the second substrate to form a liquid crystal layer, wherein the liquid crystal layer is in contact with the first alignment film, the coplanar transparent electrode layer and the second alignment film in the slit; and the liquid crystal composition comprises dual-frequency liquid crystal molecules and dual-frequency reactive mesogens;
applying a high frequency alternating electric field onto only the adjacent transparent electrodes having different polarities on the second substrate, so that a long axis of molecules of a liquid crystal composition is arranged vertical to a direction of the electric field and a pre-tilted angle is defined there between; and applying an ultraviolet (UV) light thereto, so as to finish the alignment of the liquid crystal composition; and
attaching a polarizer onto one surface of the first and second substrates opposite to the liquid crystal composition, respectively, so as to form a liquid crystal panel;
wherein the liquid crystal compositions are driven by applying a low-frequency alternating electric field onto only the adjacent transparent electrodes having the different polarities on the second substrate to finish the drive of the liquid crystal composition, so that the long axis of molecules of the liquid crystal compositions is arranged parallel to the direction of the electric field.

2. The manufacturing process according to claim 1, wherein at least two of the coplanar transparent electrodes are disposed parallel to each other, and span the second substrate, respectively.

3. The manufacturing process according to claim 1, wherein the frequency range of the high frequency alternating electric field is between 1000 Hz and 10000 Hz.

4. The manufacturing process according to claim 1, wherein the coplanar transparent electrode layer is made of indium tin oxide (ITO).

5. The manufacturing process according to claim 1, wherein the first substrate is a color filter (CF) substrate, and the second substrate is a thin film transistor (TFT) array substrate.

6. A manufacturing process of an in-plane-switching mode liquid crystal panel, comprising steps of:
providing a first substrate and a second substrate, wherein a first alignment film is formed on the first substrate and a second alignment film is formed on the second substrate;
forming a coplanar transparent electrode layer made of indium tin oxide (ITO) on the second alignment film of the second substrate, wherein the coplanar transparent electrode layer comprises at least two parallel transparent electrodes, and a slit is formed between the transparent electrodes which span the second substrate, respectively;
filling a liquid crystal composition into a space between the first substrate and the second substrate to form a liquid crystal layer, wherein the liquid crystal layer is in contact with the first alignment film, the coplanar transparent electrode layer and the second alignment film in the slit; wherein the liquid crystal composition comprises dual-frequency liquid crystal molecules and dual-frequency reactive mesogens;
applying a high frequency alternating electric field with a frequency range between 1000 Hz and 10000 Hz onto only the adjacent transparent electrodes having different polarities on the second substrate, so that a long axis of molecules of the liquid crystal composition is arranged vertical to a direction of the electric field and a pre-tilted angle is defined therebetween; and applying an ultraviolet (UV) light thereto, so as to finish the alignment of the liquid crystal composition; and
attaching a polarizer onto one surface of the first and second substrates opposite to the liquid crystal composition, respectively, so as to form a liquid crystal panel;
wherein the liquid crystal compositions are driven by applying a low-frequency alternating electric field with a frequency less than 250 Hz onto only the adjacent transparent electrodes having the different polarities on the second substrate to finish the drive of the liquid crystal composition, so that the long axis of molecules of the liquid crystal compositions is arranged parallel to the direction of the electric field.

7. The manufacturing process according to claim 6, wherein the first substrate is a color filter (CF) substrate, and the second substrate is a thin film transistor (TFT) array substrate.

8. An in-plane-switching mode liquid crystal panel, comprising:
- a first substrate having a first alignment film;
- a second substrate having a second alignment film;
- a coplanar transparent electrode film disposed on the second alignment film of the second substrate, wherein the coplanar transparent electrode layer comprises at least two transparent electrodes, and a slit is formed between the transparent electrodes; and
- a liquid crystal layer disposed in a space between the first alignment film of the first substrate and the coplanar transparent electrode layer of the second substrate, wherein the liquid crystal layer comprises dual-frequency liquid crystal molecules and dual-frequency reactive mesogens;
- a long axis of the liquid crystal compositions are arranged in in different directions when an alternating electric field is driven by different driving frequencies onto only the adjacent transparent electrodes having the different polarities on the second substrate;
- wherein a plurality of the liquid crystal compositions arranged based on a pre-tilted angle are formed onto surfaces of the first alignment film and the coplanar transparent electrode layer opposite to the liquid crystal layer, respectively.

9. The liquid crystal panel according to claim 8, wherein at least two coplanar transparent electrodes are disposed each other, and span the second substrate, respectively.

10. The liquid crystal panel according to claim 8, wherein the coplanar transparent electrode layer is made of indium tin oxide (ITO).

11. The liquid crystal panel according to claim 8, wherein the first substrate is a color filter (CF) substrate, and the second substrate is a thin film transistor (TFT) array substrate.

12. The manufacturing process according to claim 2, wherein the frequency range of the high frequency alternating electric field is between 1000 Hz and 10000 Hz.

13. The manufacturing process according to claim 2, wherein the coplanar transparent electrode layer is made of indium tin oxide (ITO).

14. The manufacturing process according to claim 2, wherein the first substrate is a color filter (CF) substrate, and the second substrate is a thin film transistor (TFT) array substrate.

15. The liquid crystal panel according to claim 9, wherein the coplanar transparent electrode layer is made of indium tin oxide (ITO).

16. The liquid crystal panel according to claim 9, wherein the first substrate is a color filter (CF) substrate, and the second substrate is a thin film transistor (TFT) array substrate.

* * * * *